United States Patent

Wang

[11] Patent Number: 5,698,096
[45] Date of Patent: Dec. 16, 1997

[54] FILTER OF A DRINKING WATER MACHINE

[76] Inventor: Jen-Yi Wang, No. 227, Chang Shan Road, Sec. 2, Yuan Lin Town, Changhua, Taiwan

[21] Appl. No.: 740,085

[22] Filed: Oct. 24, 1996

[51] Int. Cl.⁶ .................................................. B01D 29/58
[52] U.S. Cl. .................. 210/181; 210/338; 210/458; 210/499; 29/896.62; 222/146.2; 222/189.08
[58] Field of Search ........................... 210/337, 338, 210/416.3, 499, 175, 181, 314, 315, 317, 458; 222/146.2, 189.06, 189.08; 29/896.62

[56] References Cited

U.S. PATENT DOCUMENTS

| | | | |
|---|---|---|---|
| 206,938 | 8/1878 | Emory | 210/338 |
| 1,044,074 | 11/1912 | Nugent | 210/338 |
| 1,194,275 | 8/1916 | Christianson | 210/338 |
| 2,651,414 | 9/1953 | Lawson | 210/338 |
| 2,750,045 | 6/1956 | Hoffmann et al. | 210/338 |
| 4,731,177 | 3/1988 | Hemman | 210/338 |
| 4,909,937 | 3/1990 | Hoffmann et al. | 210/338 |

FOREIGN PATENT DOCUMENTS 7379  4/1893  United Kingdom ............. 210/338

*Primary Examiner*—W. L. Walker
*Attorney, Agent, or Firm*—Beveridge Degrandi Weilacher & Young, LLP

[57] ABSTRACT

A water filter of stainless steel material is intended for use in a drinking water machine and is composed of a plurality of hollow filtration cylinders and hollow support cylinders. The filtration cylinders are different in diameter and have a minutely perforated periphery capable of separating solid particles and impurities from water. The support cylinders are different in diameter and are provided respectively with a periphery having a plurality of through holes. The support cylinders are dimensioned differently such that they can be fitted into one another, and that they can be fitted into the filtration cylinders, and further that one of the support cylinders is smallest in diameter and is provided at the top end thereof with a threaded portion engageable with a nut for fastening the filtration cylinders and the support cylinders together securely.

16 Claims, 2 Drawing Sheets

FILTER OF A DRINKING WATER MACHINE

FIELD OF THE INVENTION

The present invention relates generally to a drinking water machine, and more particularly to a filter of the drinking water machine.

BACKGROUND OF THE INVENTION

Water pollution is a world-wide problem which can not be easily dealt with. However, people try hard to minimize the adverse impact of water pollution on their health by making every effort on reduce the risk of health hazards brough about by the consumption of polluted water. As a result, there are a variety of the drinking water machines available in the market today.

The quality of a drinking water machine depends to a great extent on the filtration efficiency of the drinking water machine in view of the fact that the process of separating the impurities from the water is carried out by the filter of the drinking water machine. The conventional water filters are generally defective in design in that they are not effective in removing solid particles, impurities, etc. from the water.

SUMMARY OF THE INVENTION

The primary objective of the present invention is therefore to provide a drinking water machine with an improved filtration device capable of an effective removal of solid particles and impurities from the water. In keeping with the principle of the present invention, the foregoing objective of the present invention is attained by an improved filter, which is intended to be incorporated into a drinking water machine and is composed of a plurality of hollow cylindrical bodies made of a stainless steel material. Each of the cylindrical bodies has a perforated periphery capable of separating solid particles and impurities from the water when the water is forced through the perforated periphery of the cylindrical body. The cylindrical bodies are dimensioned differently such that they are fitted into one another to form the filter, which is located securely in the water heating tank of the drinking water machine.

The foregoing objective, features, functions, and advantages of the present invention will be more readily understood upon a thoughtful deliberation of the following detailed description of an embodiment of the present invention in conjunction with the accompanying drawings.

DETAILED DESCRIPTION OF THE EMBODIMENT

Figure 1:
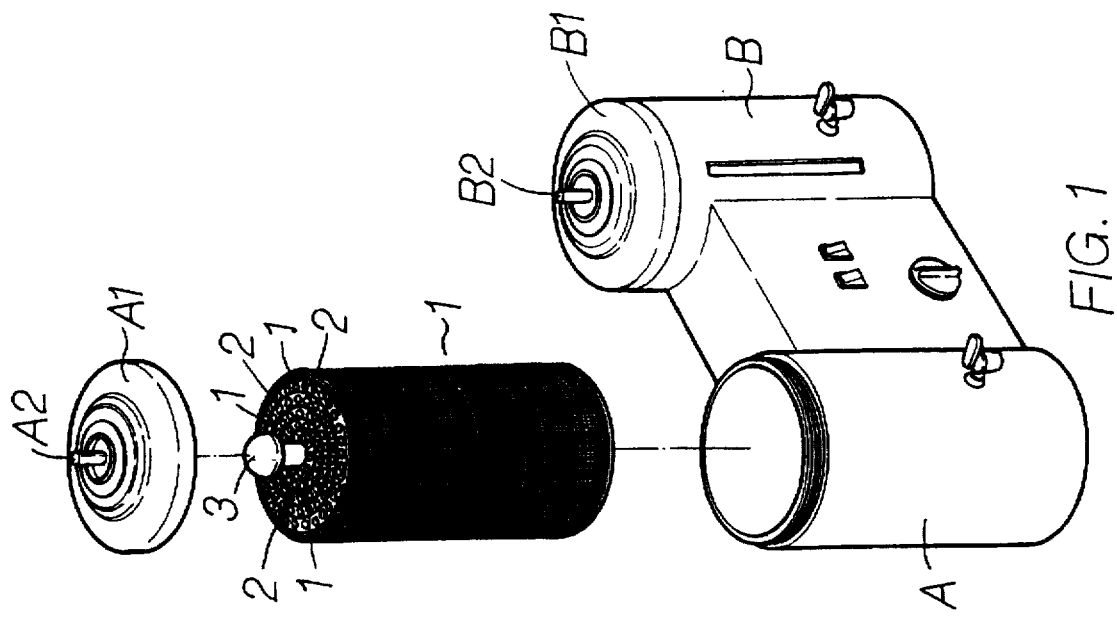
FIG. 1 shows a perspective view of a drinking water machine in which the filter of the present invention is disposed.
Figure 3:
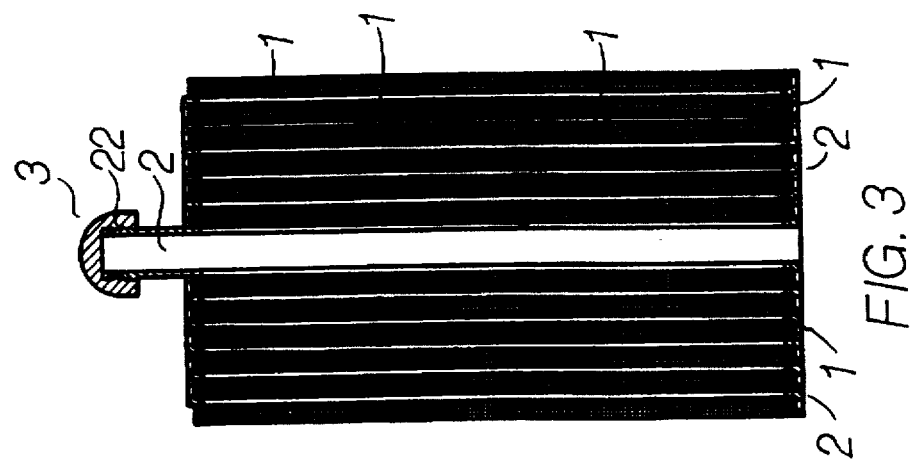
FIG. 3 shows a longitudinal sectional view of the present invention in combination.
Figure 2:
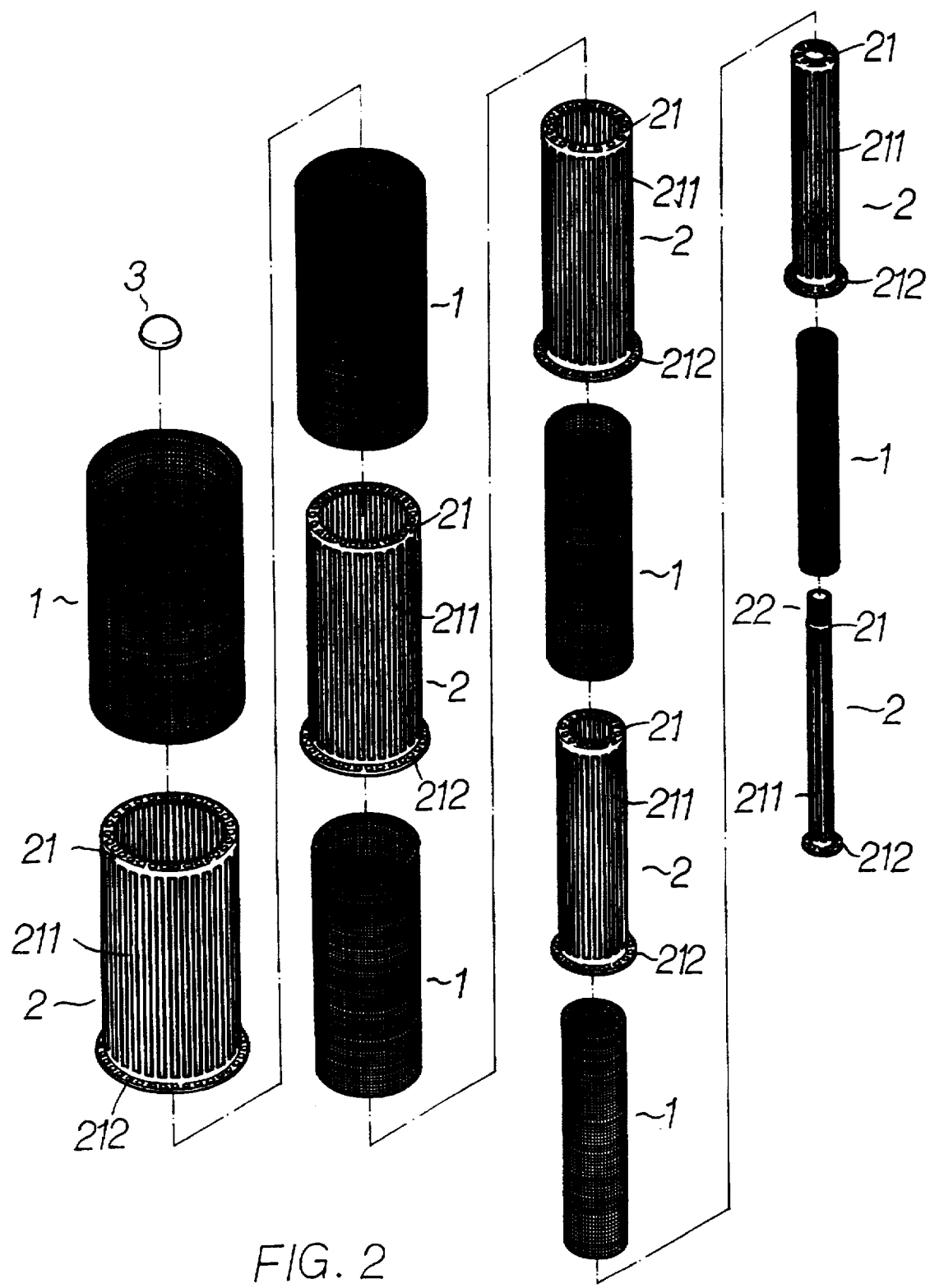
FIG. 2 shows an exploded view of the filter embodied in the present invention.

As shown in FIG. 1-3, the water filter of the embodiment of the present invention is located securely in a water heating tank A of a drinking water machine. Upon completion of preparing the drinking water in the water heating tank A, the drinking water is transported to a drinking water tank B. The water heating tank A is provided in the top cover A1 thereof with a ventilation hole A2, whereas the drinking water tank B is provided in the top cover B1 thereof with a ventilation hole B2. The ventilation holes A2 and B2 are intended to remove the gas produced in the process of preparing the drinking water. The tanks A and B are provided therein repectively with the filter of the present invention. The filter of the present invention is composed of a plurality of hollow cylindrical bodies. As illustrated in FIG. 2, there are a plurality of filtration cylinders 1 and support cylinders 2, which are fitted into or over one another to form the filter of the present invention. The filtration cylinders 1 and the support cylinders 2 are of a hollow construction and are made of a stainless steel material.

The filtration cylinders 1 are provided respectively in the periphery thereof with minute pores capable of separating solid particles and impurities from the water. The support cylinders 2 are provided respectively with a cylindrical body 21 having through holes 211 and 212.

The filtration cylinders 1 and the support cylinders 2 are dimensioned differently such that they can be appropriately fitted into or over one another to form the filter of the present invention, and that the innermost (the smallest) support cylinder 2 is provided at the top thereof with a threaded portion 22 which is engaged with a nut 3 for holding the filtration cylinders 1 and the support cylinders 2 together securely.

It is therefore readily apparent that the water filter of the present invention has inherent advantages. The water is effectively filtered by a plurality of filtration cylinders 1. In addition, the filtration cylinders 1 and the support cylinders 2 of the filter of the present invention can be easily separated for cleaning and removing the solid particles and the impurities that are deposited on the filtration cylinders 1 and the support cylinders 2.

The embodiment of the present invention described above is to regarded in all respects as being merely illustrative and not restrictive. Accordingly, the present invention may be embodied in other specific forms without deviating from the spirit thereof. The present invention is therefore to be limited only by the scope of the following appended claim.

What is claimed is:

1. A drinking water machine, comprising:

a water heating tank defining an interior chamber;

a water drinking tank defining an interior chamber;

means for fluid communication between said interior chamber of said water heating tank and said interior chamber of said water drinking tank; and at least one filter unit removably disposed in said interior chamber of said water heating tank or said interior chamber of said water drinking tank, said filter unit comprising:

a plurality of support cylinders of different diameters, each having a bottom end lip extending radially outward, at least one of said support cylinders having a top end lip extending radially inward and an innermost support cylinder having a threaded top end extended portion for threadably receiving a nut, each of said bottom end lips and said top end lip having a plurality of flow holes defined therethrough, each of said support cylinders having a plurality of longitudinal flow slots defined circumferentially through a middle portion thereof; and a plurality of filtration cylinders of different diameters, each having a plurality of filtration pores defined therethrough, said filtration pores separating solid particles and impurities from a fluid passing therethrough, said filtration cylinders being alternately and removably engaged with said support cylinders such that one of said filtration cylinders has a bottom surface and an inner surface thereof contacting said bottom end lip and an outer peripheral surface, respectively, of said innermost support cylinder and has a top surface and an outer surface thereof contacting said top end lip and an inner peripheral surface, respectively, of at least one other support cylinder.

2. The drinking water machine defined by claim 1, wherein:

said at least one filter unit comprises two filter units, one of said two filter units being removably disposed in said water heating tank and another of said two filter units being removably disposed in said water drinking tank.

3. The drinking water machine defined by claim 2, wherein:

said filtration cylinders and said support cylinders are concentrically positioned.

4. The drinking water machine defined by claim 3, wherein:

said plurality of filtration cylinders comprise six filtration cylinders, and said plurality of support cylinders comprise six support cylinders.

5. The drinking water machine defined by claim 4, wherein:

said filtration cylinders and said support cylinders are made of stainless steel.

6. The drinking water machine defined by claim 3, wherein:

said filtration cylinders and said support cylinders are made of stainless steel.

7. The drinking water machine defined by claim 1, wherein:

said plurality of filtration cylinders comprise six filtration cylinders, and said plurality of support cylinders comprise six support cylinders.

8. The drinking water machine defined by claim 7, wherein:

said filtration cylinders and said support cylinders are concentrically positioned.

9. The drinking water machine defined by claim 8, wherein:

said filtration cylinders and said support cylinders are made of stainless steel.

10. The drinking water machine defined by claim 1, wherein:

said filtration cylinders and said support cylinders are concentrically positioned.

11. The drinking water machine defined by claim 10, wherein:

said filtration cylinders and said support cylinders are made of stainless steel.

12. A filter unit, comprising:

a plurality of support cylinders of different diameters, each having a bottom end lip extending radially outward, at least one of said support cylinders having a top end lip extending radially inward and an innermost support cylinder having a threaded top end extended portion for threadably receiving a nut, each of said bottom end lips and said top end lip having a plurality of flow holes defined therethrough, each of said support cylinders having a plurality of longitudinal flow slots defined circumferentially through a middle portion thereof; and a plurality of filtration cylinders of different diameters, each having a plurality of filtration pores defined therethrough, said filtration pores separating solid particles and impurities from a fluid passing therethrough, said filtration cylinders being alternately and removably engaged with said support cylinders such that one of said filtration cylinders has a bottom surface and an inner surface thereof contacting said bottom end lip and an outer peripheral surface, respectively, of said innermost support cylinder and has a top surface and an outer surface thereof contacting said top end lip and an inner peripheral surface, respectively, of at least one other support cylinder.

13. The filter unit defined by claim 12, wherein:

said plurality of filtration cylinders comprise six filtration cylinders, and said plurality of support cylinders comprise six support cylinders.

14. The filter unit defined by claim 13, wherein:

said filtration cylinders and said support cylinders are made of stainless steel and are concentrically positioned, said plurality of filtration cylinders comprise six filtration cylinders, and said plurality of support cylinders comprise six support cylinders.

15. The filter unit defined to claim 12, wherein:

said filtration cylinders and said support cylinders are concentrically positioned.

16. The filter unit defined by claim 12, wherein:

said filtration cylinders and said support cylinders are made of stainless steel.

* * * * *